United States Patent [19]

Spoliansky

[11] Patent Number: 4,778,196
[45] Date of Patent: Oct. 18, 1988

[54] TWIST-LATCH TRAILER HITCH

[76] Inventor: William S. Spoliansky, 23770 Park Belmonte Dr., Calabasas Park, Calif. 91302

[21] Appl. No.: 100,986

[22] Filed: Sep. 25, 1987

[51] Int. Cl.$^4$ .............................................. B60D 1/06
[52] U.S. Cl. .................................... 280/512; 403/143
[58] Field of Search ................... 280/512, 511, 423 A, 280/402; 403/141, 143, 322, 325, 327, 328

[56] References Cited

U.S. PATENT DOCUMENTS

| 2,035,486 | 3/1936 | Larson | 280/512 |
| 3,650,546 | 3/1972 | Koenig | 280/512 |

FOREIGN PATENT DOCUMENTS 745049  2/1944  Fed. Rep. of Germany ...... 280/511

Primary Examiner—John A. Pekar
Attorney, Agent, or Firm—Paul R. Wylie

[57] ABSTRACT

In this improved ball-and-socket trailer hitch, the heavy coil spring, conventionally utilized to forwardly bias a latching collar, is eliminate; instead threaded means are provided to move the collar back and forth when it is rotated manually. Unlatching is much easier in the absence of strong spring bias on the collar, so the need for additional collar-actuating mechanism such as levers, handles and linkages, often required is conventional hitches, is eliminated. The collar may locked in a forward latched position by the inclusion of a pivoted, thumb-operated lock lever, which is spring loaded to automatically drop into the rear edge of the collar when the collar is moved into its latched position, and thus lock the collar in this latched position, constrained against rearward or rotational movement, to eliminate risk of trailer uncoupling due to unintended unlatching of the hitch. The lock lever may be adapted to accept a padlock to avoid trailer theft. The threaded collar-actuating system of this invention is independent of particular configurations of ball-enclosure jaws, thus it is adaptable for designing into a variety of trailer hitches of different types.

11 Claims, 2 Drawing Sheets

TWIST-LATCH TRAILER HITCH

FIELD OF THE INVENTION

This invention relates to trailer hitches of the ball-and-socket type for coupling towed vehicles to towing vehicles, and more particularly it relates to such hitches having a two-part ball-enclosure cavity formed from a body portion hinged to a swinging cap, latchable together by a movable collar so as to capture a towing ball.

STATE OF THE PRIOR ART

Many trailer hitches in past and present use are of the category typified by U.S. Pat. No. 1,927,591 to Jacobs which discloses and claims a trailer hitch with a ball-enclosure socket divided into two hingedly connected members, a body and a cap, which may be latched together in a closed position by a slidably-mounted spring-urged sleeve. U.S. Pat. No. 1,977,065, also to Jacobs, which discloses and claims certain improvements relating to durability, efficiency, ease of manufacture and cost, again utilizes a slidably-mounted spring-urged sleeve to latch together a shank-mounted semispherical socket and a complementary socket member hinged to the first mentioned socket.

During the many years of successful use of such trailer hitches, further patents have issued, teaching various improvements, but retaining the now-conventional spring-urged sleeve as taught by the Jacobs patents. For example, U.S. Pats. No. 3,880,450 to Ware, assigned to Lear Siegler Inc., No. 4,133,553 to Pierce, and No. 4,157,190 to Nyman, the latter two assigned to The Hammerblow Corporation, all utilize a slidable collar biased forwardly by a coil spring.

In the simpler form of such prior art hitches, the collar must be pushed back and held manually against the force of the spring bias to unlatch and open the jaws each time the trailer is unhitched or rehitched. This is an inconvenience at best and may demand an excessive amount of human strength in a heavy duty hitch utilizing a strong spring. Consequently hitches of this type often require collar-shifting levers and linkage, such as the mechanism 24 in the Pierce patent, and handle 24 in the Nyman patent to facilitate retracting the collar and holding it in a retracted position against the bias force of the coil spring.

SUMMARY OF THE INVENTION

It has a primary object of the present invention to provide a ball-and socket type trailer hitch having novel collar-actuating means for advancing the latching collar to its latched position without requiring a conventional collar-biasing coil spring.

A further object is to enable easy manual retraction of the collar to an unlatched position without requiring additional levers, handles or linkages to move the collar.

It was still a further object to provide a mechanism for locking the latching collar of this invention in its latching position.

These and other objects have been accomplished in the present invention of an improved trailer hitch in which a threadedly-actuated latching collar has eliminated the need for a collar-biasing spring as well as the need for collar-actuating mechanism such as levers, handles and associated linkage.

DETAILED DESCRIPTION

Figure 1:
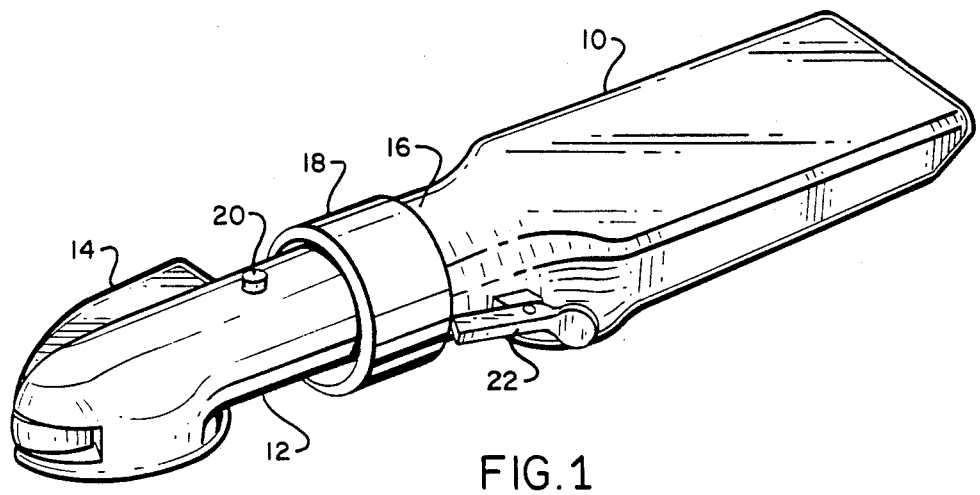
FIG. 1 is a perspective view of a trailer hitch in accordance with this invention in an illustrative embodiment.

The perspective view in FIG. 1 shows a trailer hitch of the ball-and socket type having a vehicle-attachment part 10 attached to a main body 12. A downward-facing two-part ball-enclosure cavity, not visible in this view, is formed partially in the main body 12 and partially in a front-hinged swinging cap 14, shown in an open position. Surrounding body 12 is a movable latching sleeve 18, shown in a retracted position, immediately behind pin 20, with a pivoted locking lever 22 resting against its outer surface.

Figure 2:
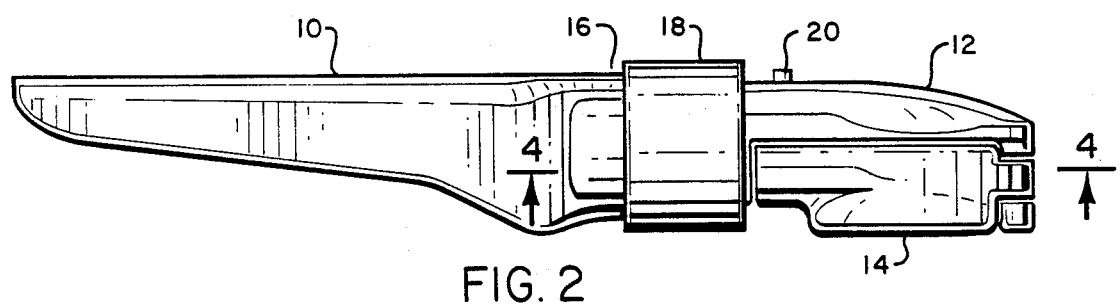
FIG. 2 is a side view of the trailer hitch.

The side view in FIG. 2, as seen from the far side of FIG. 1, shows the parting line between main body 12 and cap 14, hinged at the front end of the hitch, at the right of the figure. On top of body 12 is seen a pin 20, which may be made integral with body 12 or else threaded or press-fitted into a hole in body 12.

Figure 3:
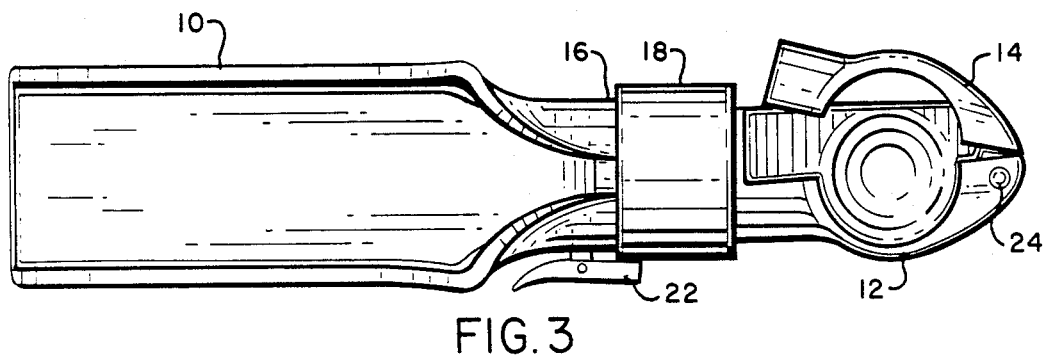
FIG. 3 is a bottom view of the trailer hitch.

The bottom view, FIG. 3, shows the open interior region of vehicle attachment part 10, with locking mechanism 22 attached near, surrounded by collar 18, which is located in its rearward unlatched position, clear of cap 14, which is hinged to body 12 at hinge pin 24, and is shown in an open position, ready to accept a towing ball.

Figure 4:
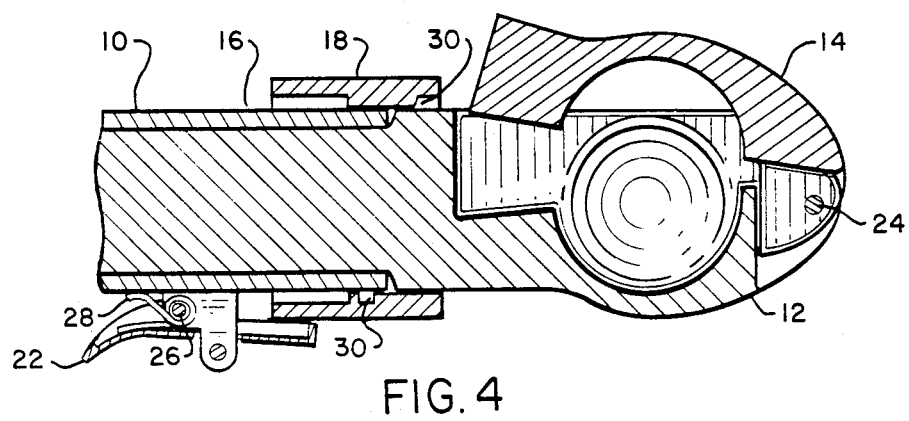
FIG. 4 is a cross-sectional view taken on line 4—4 of FIG. 2 showing the collar in its rearward unlatched position and the cap swung open.

In FIG. 4 which is a cross-sectional view of 4—4 in FIG. 2, it is seen that vehicle attachment part 10 is welded to the side and rear of main body 12. Collar 18 is again shown retracted rearward to its unlatched position, allowing cap 14 to swing open as shown, hinged at pin 24. Locking mechanism 22 is seen pivoted at pin 26 and urged against collar 18 by torsion spring 28. At the inside circumference of collar 18 is seen the rectangular cross-section of a thread groove 30.

Figure 5:
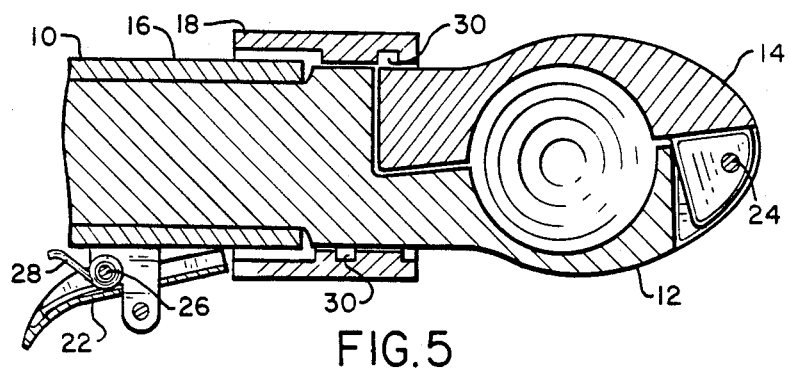
FIG. 5 is a cross-sectional view similar to FIG. 2 showing the collar in its forward latched position holding the cap closed.

In FIG. 5 the same cross-section as in FIG. 4 is seen with the cap 14 in closed position against body 12, with collar 18 moved forward to a latching position, where cap 14 is constrained from swinging open by collar 18, which is constrained from moving backward by the front end of locking mechanism 22 having engaged the rear edge of collar 18.

Figure 6A:
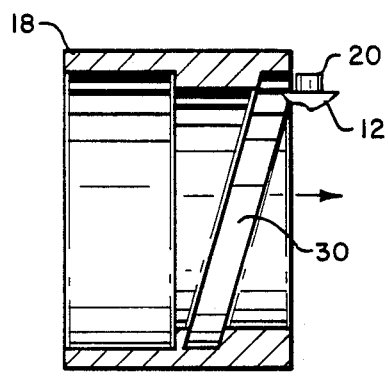
FIGS. 6(a) and 6(b) are cross-sectional views of the latching collar.
Figure 6B:
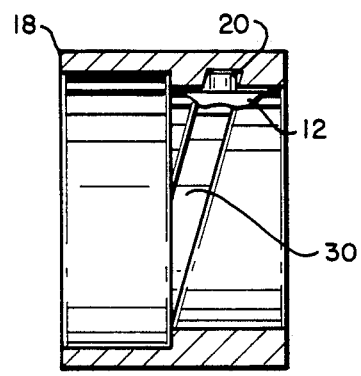

FIG. 6, a cross-sectional view of collar 18 by itself, shows the helical thread groove 30 defining one and one half-revolutions around the inside circumference of collar 18.

Shaft sleeve 16 is fitted over the shaft end of body 12.

Figure 7:
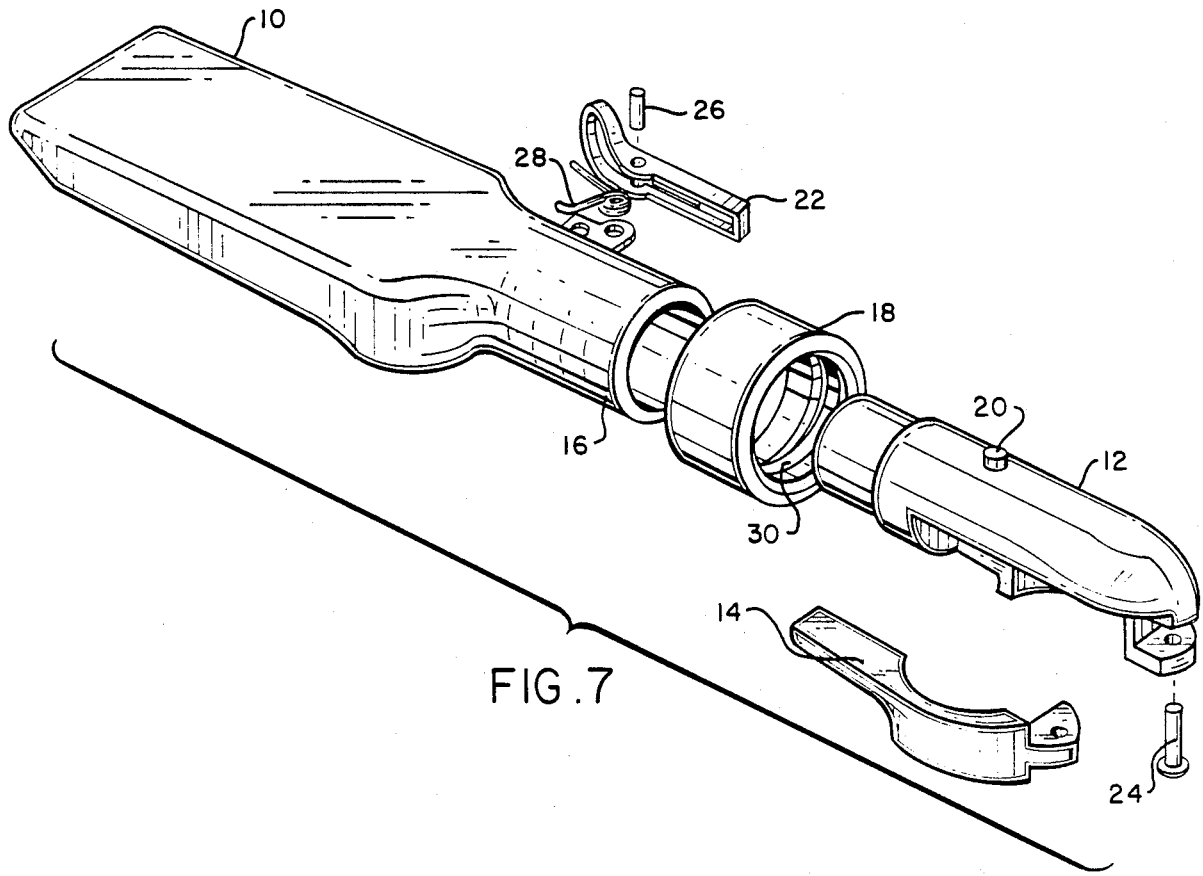
FIG. 7 is an exploded view of the parts of the trailer hitch.

The component parts of the trailer hitch are shown in the exploded perspective view of FIG. 7. The vehicle-attachment part 10 may be stamped and formed from sheet steel. Part 10 is normally attached to the tongue of a trailer, since a towing vehicle is normally fitted with a towing ball, but this arrangement could be reversed.

The body 12 and cap 14 are forged, and are assembled together by inserting hinge pin 24.

The rear shaft portion of body 12 is inserted into collar 18 with its internal helical thread groove 30 engaging pin 20, enabling collar 18 to be shifted back and forth between the positions shown in FIG. 4 and FIG. 5 by rotating collar 18 approximately one and a half-turns, in accordance with the length and pitch of thread groove 30.

In FIG. 4, collar 18 is shown retracted rearward to its unlatched position, which allows cap 14 to swing open as shown, constraining collar 18 by an internal step against the forward edge of body 10 while in FIG. 5, the collar 18 has been advanced, by a one and a half-turn rotation of its helical thread groove 30 in engagement with pin 20, to a latching position in which cap 14 is latched in its closed position as shown, which is the working position in which a towing ball is captivated. This position corresponds to pin 20 reaching the rear end of thread groove 30, and thus constraining collar 18 against further forward travel.

The partial assembly comprising main body 12, cap 14, collar 18 is fastened to vehicle-attachment part 10 by welding of main body 112, as seen in FIG. 4 and FIG. 5.

The locking assembly 22 is welded or otherwise attached against part 10, with a thumb-operate lever hinged and spring-loaded to hold it against collar 18 in its unlocked position as shown in FIG. 4. Assembly 22 is dimensioned and located so as to automatically snap under spring action against the rear edge of collar 18 when it is advanced to the latched position shown in FIG. 5. In this position, the end of lever 22, locks collar 18 in its latching position by constraining it against rearward movement, thus ensuring against unintentional delatching and risk of decoupling during towing.

Unlatching the hitch is accomplished by depressing the curved thumb pad on lever 22, seen in FIG. 3, which lifts the opposite end of the lever and allows collar 18 to be rotated so as to retract it backward to its unlatched position, allowing cap 14 to be swung open to disengage the towing ball.

Thus, in a trailer hitch configured in accordance with the present invention, the twist-latch action of collar 18 enabled by the one and a half-turns internal groove 30 in engagement with pin 20, and locking action of lever 22, satisfactorily performs all of the functions conventionally performed by a spring-biased latching collar, with the advantage of eliminating the coil spring normally required in conventional couplers, and greatly reducing the amount of force required to retract the collar for unlatching the cap, and eliminating the need for additional levers and linkage which are often needed to perform this funciton in conventional couplers because of the strong spring bias applied continuously to the collar. Even in a heavy duty hitch, the unbiased twist-latch collar of this invention is easily actuated without need of additional leverage, by manually rotating it one and a half-turns to shift it back and forth between its latch and unlatched positions.

It should be recognized that in addition to the particular trailer hitch embodiment disclosed herein as illustrative of this invention, the novel twist-latch collar is readily adaptable to many different coupler, configurations, in fact its principle may be designed into virtually any coupler utilizing a latching collar, since the collar-shifting mechanism is largely independent of configuration variations of the body 12, cap 14, and vehicle-fastening part 10.

Regarding the locking assembly 22, there exist viable alternatives, such as the use of pin, possibly spring-loaded, penetrating a hole in the collar 18 and engaging a corresponding hole in body 12, located to line up with the hole in the collar 18 in its latched position.

The length and pitch of thread groove 30 of collar 18 determine the travel range of collar 18 however, the one and a half turns twist-lock action and a travel distance of approximately one inch have been determined as optimal in the illustrative embodiment described herein. The principle of the invention is inherently tolerant to reasonable variations in both the amount of collar rotation and travel.

Threading means may be implemented alternatively by locating the thread groove around the shaft of body 12 and locating a thread-engaging pin inside collar 18.

Locking lever 22 may be adapted to provide a safety pin to avoid inadvertant unlatching or a padlock in lieu of the safety pin to discourage trailer theft.

The invention may be embodied in other specific forms without departing from the spirit or essential characteristics thereof. The present embodiments are therefore to be considered in all respects as illustrative and not restrictive, the scope of the invention being indicated by the the appended claims rather than by the foregoing description; and all changes which come within the meaning and range of equivalency of the claims are therefore intended to be embraced therein.

What is claimed is:

1. In a trailer hitch of the ball-and-socket type, for coupling a towed vehicle to a towing vehicle, wherein a towing ball is secured to one of said vehicles and a socket assembly is secured to the other vehicle, and wherein the socket assembly has a body member and a cooperating cap member hinged together at a front portion thereof, each of said members having an internal recess forming, in combination, a socket cavity for capturing said ball when said cap member is closed against said body member along parting surfaces thereof, said body further forming a substantially cylindrical rearward shaft secured to vehicle connecting means; the improvement which comprises:

a latching collar, positioned around said rearward shaft, and cooperating threading means, in said collar and on said rearward shaft, whereby rotation of said collar is caused to translate into movement of said collar back and forth along said shaft between (a) a forward latched position, in which said collar encompasses a portion of said cap and thus constrains it in a closed position against said said body so as to captivate said towing ball, and (b) a rearward unlatched position, in which said cap, being hinged at a front portion thereof and having no portion encompassed by said collar, may be swung away from said body to an open position to release said towing ball.

2. The invention as in claim 1 wherein said threading means comprise an inside-circumferential thread groove, in said collar, engaging a thread-engagement pin protruding from said shaft.

3. The invention as in claim 2 wherein said thread groove is rectangular in cross-section, disposed in said collar around its inner circumferential wall, presenting an entry opening for said thread engagement pin at the front edge of said collar, and is pitched so as to cause said collar to shift along said shaft between said forward latched position and said rearward unlatched position in response to rotation of said collar.

4. The invention as in claim 3 wherein said thread groove is made to extend approximately one and one half turns around the inner circumference of said collar, and is linearly pitched such that approximately one and a half turns rotation of said collar will shift said collar along said shaft the full distance between said forward latched position and said rearward unlatched position.

5. The invention as in claim 3 further comprising locking means adapted to lock said collar in said forward latched position, constrained against rotational or rearward movement, whereby said cap is secured in said closed position against said body, thus preventing unintentional decoupling of an enclosed towing ball.

6. The invention as in claim 5 wherein said locking means comprises a pivoting thumb-operated lever attached to said socket assembly, a spring urging an end of said lever against said collar, whereby, when said collar is moved to said locking position it becomes constrained against rotation and rearward movement away from said latched position, and whereby said lever is enabled, upon manual actuation in opposition to said spring, to remove said lever and from said region and thus unlock said collar so that it may be retracted to said rearward unlatched position for releasing a captivated towing ball.

7. The invention as in claim 6 wherein said locking means further comprises padlocking means enabling said lever to be padlocked in an engaged mode with said collar locked in said latched position, whereby theft of a coupled trailer may be discouraged.

8. In a trailer hitch of the ball-and-socket type having a cap and body, hinged together at a forward end, forming a two-part cavity for releasably capturing a towing ball, the improvement comprising;

a rotatable latching collar surrounding a shaft formed at the rearward region of said body, said collar being threadedly engaged with said shaft at the rearward region of said body whereby rotation of said collar translates into movement of said collar along said shaft ranging from (a) a forward latched position where said collar encompasses a portion of said cap, constraining it in a closed position against said body so as to retain a captured towing ball, to (b) a rearward unlatched position wherein said collar encompasses no portion of said cap, allowing said cap to hingedly swing to an open position relative to said body so as to release a previously-captured towing ball.

9. The invention as in claim 8 wherein said collar is threadedly engaged with said shaft by threaded means comprising;

a helical thread groove around a portion of the inside circumference of said collar, and a cooperating thread engaging pin disposed on said shaft.

10. The invention as in claim 8 wherein said collar is threadedly engaged with said shaft by threaded means comprising:

a helical thread groove around a portion of the outside circumference of said shaft, and a cooperating thread-engaging pin disposed in said collar.

11. The invention as in claim 8 further comprising a spring-loaded lock lever, pivotally attached to said trailer hitch, adapted to positively engage said collar and constrain it against rotation and rearward movement whenever said collar is shifted into said latched position, whereby said cap is secured in a closed mode against said body so as to ensure retention of a captured towing ball, said lock lever being made capable of manual disengagement from said collar, releasing said collar to be movable to said unlatched position so as to enable release of a previously-captured towing ball

* * * * *